United States Patent
Knebel et al.

(10) Patent No.: US 12,124,019 B2
(45) Date of Patent: Oct. 22, 2024

(54) MICROSCOPE WITH A WIDE-FIELD ILLUMINATOR AND A COMMON DETECTION OBJECTIVE FOR A CAMERA DETECTOR AND A POINT DETECTOR

(71) Applicant: LEICA MICROSYSTEMS CMS GMBH, Wetzlar (DE)

(72) Inventors: Werner Knebel, Kronau (DE); Florian Fahrbach, Mannheim (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 602 days.

(21) Appl. No.: 17/415,761

(22) PCT Filed: Dec. 19, 2019

(86) PCT No.: PCT/EP2019/086299
§ 371 (c)(1),
(2) Date: Jun. 18, 2021

(87) PCT Pub. No.: WO2020/127726
PCT Pub. Date: Jun. 25, 2020

(65) Prior Publication Data
US 2022/0113523 A1   Apr. 14, 2022

(30) Foreign Application Priority Data

Dec. 21, 2018 (DE) ...................... 10 2018 133 509.1
Apr. 26, 2019 (DE) ...................... 10 2019 110 869.1

(51) Int. Cl.
*G02B 21/00*   (2006.01)
*G02B 27/14*   (2006.01)
*H04N 23/56*   (2023.01)

(52) U.S. Cl.
CPC ....... *G02B 21/0032* (2013.01); *G02B 21/008* (2013.01); *G02B 27/141* (2013.01); *H04N 23/56* (2023.01)

(58) Field of Classification Search
CPC .............. G02B 21/0032; G02B 21/008; G02B 27/141; G02B 21/00; G02B 21/0004;
(Continued)

(56) References Cited

U.S. PATENT DOCUMENTS 5,377,003 A   12/1994 Lewis et al.
5,479,252 A   12/1995 Worster et al.
(Continued)

FOREIGN PATENT DOCUMENTS

CN   101498833 A   8/2009
CN   103926228 A   7/2014
(Continued)

*Primary Examiner* — Arnel C Lavarias
(74) *Attorney, Agent, or Firm* — LEYDIG, VOIT & MAYER, LTD.

(57) ABSTRACT

A microscope includes a wide-field illuminator configured to illuminate at least one selected region of a sample, and a beam splitter configured to generate a first detection beam path and a second detection beam path. A camera detector is arranged within the first detection beam path and is configured to record images of the selected region of the sample. A point detector is arranged within the second detection beam path and is configured to acquire a predetermined subregion of the sample lying within the selected region. A detection objective, which is arranged within the first and second detection beam paths on an object side of the beam splitter. The detection objective is a common detection objective for the camera detector and the point detector.

18 Claims, 5 Drawing Sheets

(58) Field of Classification Search
CPC .............. G02B 21/002; G02B 21/0024; G02B 21/0036; G02B 21/0048; G02B 21/0052; G02B 21/006; G02B 21/0064; G02B 21/0076; G02B 21/06; G02B 21/18; G02B 21/36; G02B 21/361; G02B 21/365; G02B 21/367; G01N 21/6456; G01N 21/6458; G01N 21/6486; G01N 2021/6463; H04N 23/56
USPC ....... 359/385, 362, 363, 368, 369, 388, 390, 359/434
See application file for complete search history.

(56) References Cited

U.S. PATENT DOCUMENTS

| | | | |
|---|---|---|---|
| 5,528,368 | A | 6/1996 | Lewis et al. |
| 6,399,935 | B1 | 6/2002 | Jovin et al. |
| 6,867,899 | B2 | 3/2005 | Knebel |
| 2004/0047030 | A1 | 3/2004 | MacAulay |
| 2004/0133112 | A1 | 7/2004 | Rajadhyaksha |
| 2004/0174593 | A1 | 9/2004 | Weyh et al. |
| 2006/0181766 | A1 | 8/2006 | Uhl et al. |
| 2010/0294949 | A1 | 11/2010 | Sasaki et al. |
| 2015/0205087 | A1 | 7/2015 | Schumann |
| 2015/0226670 | A1 | 8/2015 | Kleppe et al. |
| 2015/0286042 | A1 | 10/2015 | Hilbert et al. |
| 2015/0362713 | A1* | 12/2015 | Betzig ................. G02B 21/006 250/459.1 |
| 2021/0165198 | A1 | 6/2021 | Mueller-Rentz et al. |

FOREIGN PATENT DOCUMENTS

| | | | |
|---|---|---|---|
| DE | 69806496 T2 | 3/2003 | |
| DE | 112004000340 T5 | 1/2006 | |
| DE | 102010035003 A1 * | 2/2012 | ......... G01N 21/6408 |
| DE | 102018124129 A1 | 6/2019 | |
| JP | H11-194275 A | 7/1999 | |
| JP | 2000-056244 A | 2/2000 | |
| JP | 2006-039048 A | 2/2006 | |
| JP | 2010-271569 A | 12/2010 | |
| JP | 2010-286565 A | 12/2010 | |
| JP | 2015-523602 A | 8/2015 | |
| JP | 2015-526764 A | 9/2015 | |
| JP | 2015-537236 A | 12/2015 | |

* cited by examiner

MICROSCOPE WITH A WIDE-FIELD ILLUMINATOR AND A COMMON DETECTION OBJECTIVE FOR A CAMERA DETECTOR AND A POINT DETECTOR

CROSS REFERENCE TO RELATED APPLICATIONS

This application is a U.S. National Phase application under 35 U.S.C. § 371 of International Application No. PCT/EP2019/086299, filed on Dec. 19, 2019, and claims benefit to German Patent Application No. DE 10 2018 133 509.1, filed on Dec. 21, 2018, and German Patent Application No. DE 10 2019 110 869.1, filed on Apr. 26, 2019. The International Application was published in German on Jun. 25, 2020, as WO 2020/127726 A2 under PCT Article 21(2).

FIELD

The invention relates to a microscope having a wide-field illumination unit (wide-field illuminator) for illuminating at least one selected region of a sample. The microscope furthermore comprises a camera detection unit (camera detector) for recording images of the selected region of the sample.

BACKGROUND

Microscopes having a camera detection unit (camera detector), in the following this means in particular a detection unit which comprises a position-resolving detector, are known from the prior art. The camera detection unit permits a parallelization of the detection process, since an image of a selected region of the sample can be created in only one measurement hereby. However, camera detection units do not have the time resolution and/or spectral resolution necessary for certain microscopy applications, for example fluorescence lifetime imaging microscopy (FLIM) or fluorescence correlation spectroscopy (FCS).

A confocal microscope is known from U.S. Pat. No. 6,867,899 B2, which comprises a light source for illuminating a sample and a spectrometer, which detects detection light originating from the sample. The microscope furthermore comprises an acousto-optical deflector (AOD), which deflects illumination light originating from the light source onto the sample and deflects the detection light originating from the sample into the spectrometer. The spectrometer is a point detector, i.e., a non-position-resolving detector. An image of a selected region is produced in multiple successive measurements using the spectrometer, i.e., serially. More high-resolution data are sometimes generated in this case than are actually required.

SUMMARY

In an embodiment, the present disclosure provides a microscope that includes a wide-field illuminator configured to illuminate at least one selected region of a sample, and a beam splitter configured to generate a first detection beam path and a second detection beam path. A camera detector is arranged within the first detection beam path and is configured to record images of the selected region of the sample. A point detector is arranged within the second detection beam path and is configured to acquire a predetermined subregion of the sample lying within the selected region. A detection objective, which is arranged within the first and second detection beam paths on an object side of the beam splitter. The detection objective is a common detection objective for the camera detector and the point detector.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
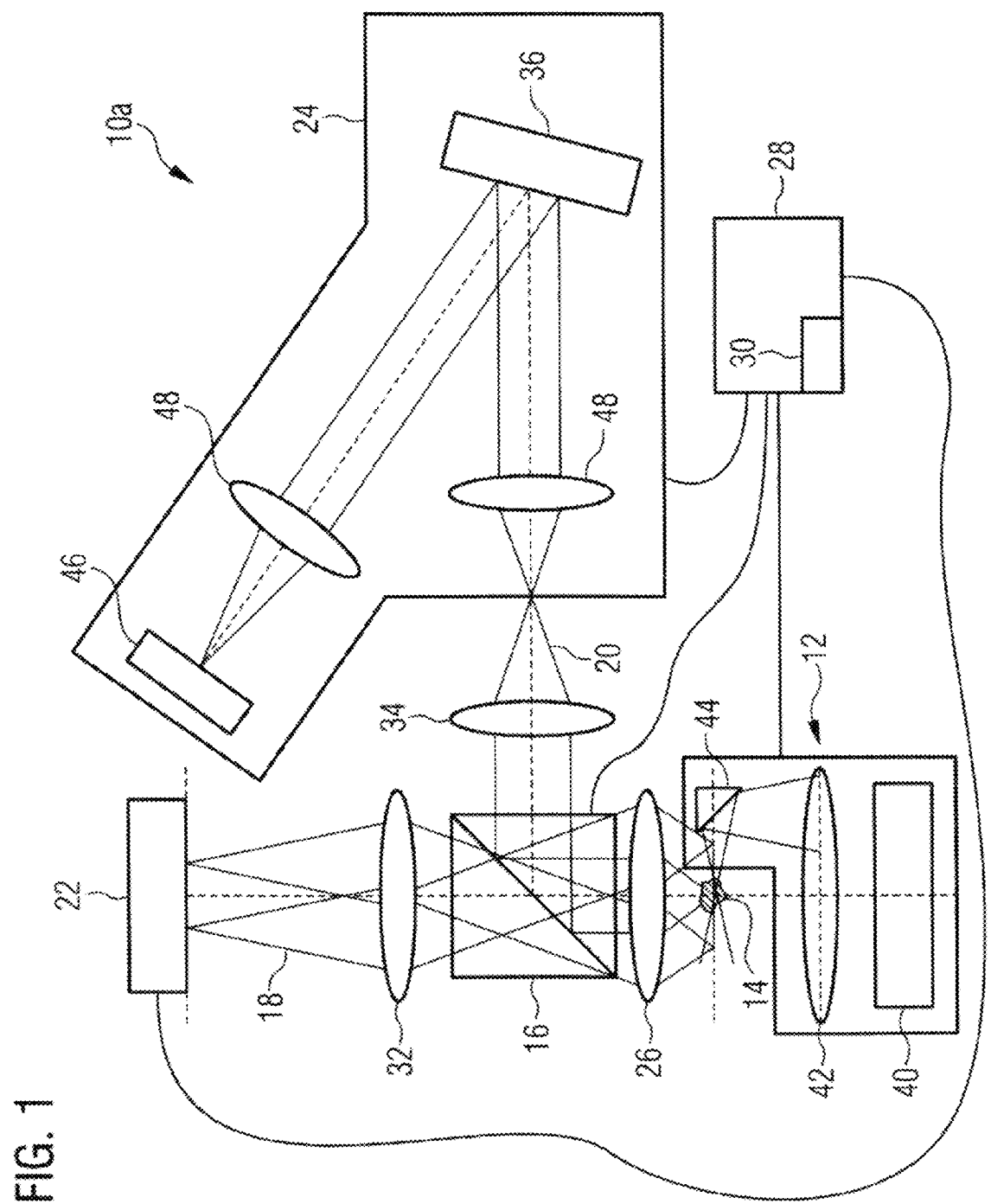
FIG. 1 shows an exemplary embodiment of a microscope having a camera detection unit and a point detection unit.

In an embodiment, the present invention provides a microscope which combines the advantages of a parallel detection with the advantages of a serial detection.

The microscope according to an embodiment of the invention comprises a wide-field illumination unit for illuminating at least one selected region of a sample and a beam splitter unit (beam splitter) for generating a first detection beam path and a second detection beam path. The microscope furthermore comprises a camera detection unit arranged inside the first detection beam path for recording images of the selected region of the sample and a point detection unit (point detector) arranged inside the second detection beam path for acquiring a predetermined subregion of the sample located inside the selected region. On the object side of the beam splitter unit, a detection objective is arranged inside the first and second detection beam path, which is provided as a common detection objective for the camera detection unit and the point detection unit.

The camera detection unit can be designed in particular as a multichannel camera or a color camera. The point detection unit can also comprise multiple detectors. In particular, the detector or detectors of the point detection unit can be one or more surface detectors, which are used for a punctiform, i.e. non-position-resolved, detection. Alternatively, it is also possible that a part of the detectors of the point detection unit are formed by point detectors, i.e., non-position-resolving detectors, and a further part of the detectors of the point detection unit are formed by surface detectors which are used for a non-position-resolved detection. In particular, multiple points of the selected region of the sample can be acquired simultaneously. This can be carried out, for example, in that light used for detection is distributed by means of a micromirror actuator unit (micromirror actuator, DMD) onto various point detectors or the various regions of a surface detector of the point detection unit.

The microscope according to an embodiment of the invention combines the advantages of the camera detection unit detecting in parallel with the advantages of the point detection unit detecting in series. A camera detection unit is to be understood in particular as a position-resolving detection unit, while a point detection unit is to be understood as a non-position-resolving detection unit. The camera detection unit records large amounts of images of the selected region rapidly and in a manner careful of the sample. The point detection unit acquires the predetermined subregion located within the selected region rapidly and with a high time and/or spectral resolution. The microscope according to an embodiment of the invention can thus be used in particular for the efficient measurement of high-resolution spectra, for single molecule analysis, or in certain microscopy applications (e.g., FLIM or FCS). The microscope according to an embodiment of the invention also enables the targeted observation and tracking of dynamic processes and events. In the above-mentioned applications, it is often not necessary to acquire the entire selected region of the sample with a high time and/or spectral resolution.

In general, point detection units are faster in the acquisition approximately by the number of pixels of a comparable camera detection unit, since only one single pixel has to be read out per measurement here. The point detection unit is preferably designed to carry out measurements at megahertz rate. The image rate of a camera detection unit can generally be maximized in that only a few lines of a sensor element of the camera detection unit are read out. The image rate generally cannot be increased, however, in that the number of the columns to be read out is reduced. Therefore, the highest speed for camera detection units, here, for example, having a sensor element having 8 lines each of 2500 pixels, is typically a factor of 20,000 below the rate which can be achieved for a point detector having comparable electronics, i.e., in particular amplifier and analog-to-digital converter.

Point detectors are substantially insensitive to aberrations of the focus which are induced in the detection beam path, for example, by filter/beam splitter optical units, since they only measure the luminous intensity and not its distribution. This increases the flexibility and permits, for example, the use of inclined filters also in non-collimated parts of the beam path and thus space-saving and more cost-effective optical units.

In one advantageous refinement, the microscope comprises a control unit (controller). The control unit controls at least the point detection unit in dependence on the predetermined subregion of the sample and/or in dependence on a predetermined time for a measurement that can be carried out with the aid of the point detection unit. The measurement controlled by the control unit takes place significantly more accurately with respect to the acquisition of the predetermined subregion of the sample and/or in dependence on the predetermined time than, for example, a manually controlled measurement. In particular for certain microscopy applications, for example FLIM, it is necessary for the acquisition by the point detection unit to take place precisely at the predetermined time. The control unit can in particular restrict the predetermined subregion of the sample, set an illumination intensity, and/or set the wavelength, the wavelength range, or the wavelength ranges of the light used for illuminating the sample or the predetermined subregion of the sample. Furthermore, the control unit, in particular if the microscope is used for FLIM measurements, can synchronize pulsed illumination with a detection by the camera detection unit and/or the point detection unit, i.e., an acquisition and/or control of the times of the emission of an illumination light pulse and an in particular time-resolved acquisition of a fluorescence signal.

In a further advantageous refinement, the predetermined subregion of the sample and/or the predetermined time is stored preset in the control unit. The predetermined subregion of the sample and/or the predetermined time can be input, for example, by an operator. In particular, the images of the selected region of the sample recorded by the camera detection unit can be used as the basis for the input of the predetermined subregion and/or the predetermined time. For example, the operator can select a subregion of interest (region of interest, ROI) within one of the images recorded by the camera detection unit as the predetermined subregion.

In a further advantageous refinement, the microscope comprises an image processing unit (image processor) coupled to the control unit. The image processing unit ascertains the predetermined subregion of the sample and/or the predetermined time on the basis of at least one of the images recorded by the camera detection unit, and provides the predetermined subregion of the sample and/or the predetermined time for the control unit to control the point detection unit. The image processing unit ensures a faster and more precise determination of the predetermined subregion of the sample and/or the predetermined time than, for example, a manual determination by the operator.

The image processing unit can be in particular an intelligent image processing unit, i.e., a unit which has learned, for example, in particular with application of a machine learning method, in which subregion of the sample a detailed measurement is worthwhile. Furthermore, it is advantageous if events, for example the expression of a specific protein, can be established by the user before a time series measurement. The expression can express itself in particular by way of the increase of the fluorescence signal measured at a specific point. These events can be used as triggers for a detection using the point detection unit in a specific subregion of the sample. The image processing unit can in particular also have been trained to react to specific events, for example the above-mentioned expression.

One possible embodiment of a method carried out by means of the advantageous refinement appears as follows: A sample-protecting time series recording of a sample illuminated by means of a light sheet is carried out by means of the camera detection unit, for example over multiple hours. The recorded image data are examined by the image processing unit, which is trained or preconfigured by the user, for events, for example strengthened signals or in general the change of the signal strength in specific image regions. If events are established, the microscope thus switches briefly into the point detection mode and examines the ascertained image regions.

Measurements of the lifetime of the excited fluorescence can be carried out using the point detection unit. In particular if the camera detection unit is designed as a multichannel camera or color camera, high-resolution spectra can be ascertained in order to separate the data recorded using a multichannel camera or color camera according to dyes by means of the control unit, for example. Such a separation is also referred to as "spectral unmixing". The separation of the data recorded using a multichannel camera by means of "spectral unmixing" is also possible in principle without further information, however, the number of the channels in the case of a camera-based detection is generally restricted to 3 to 4 channels. The additional measurement of high-resolution spectra having significantly more channels can be helpful here in order to assist the "spectral unmixing" of the images which were recorded using the multichannel camera, in that additional information about the spectral composition of light originating from a sample is provided to the algorithm (or the trained image processing unit).

In a further advantageous refinement, the control unit controls the wide-field illumination unit in dependence on the predetermined subregion of the sample and/or in dependence on the predetermined time. This permits, for example, a synchronization of the wide-field illumination with the measurement carried out by the point detection unit, which is required in certain microscopy applications, for example FLIM.

In a further advantageous refinement, the beam splitter unit is formed by a mirror element switchable by the control unit. The switchable mirror element is designed in such a way that in a first switching state, detection light that originates from the sample is deflected onto the camera detection unit, and that in a second switching state, the detection light originating from the sample is deflected onto the point detection unit. A simply constructed beam splitter is implemented in this way, which in a mechanical manner permits a detection to be carried out alternately using the camera detection unit or the point detection unit. The pixels which are missing in the image acquired by means of the camera detection unit can be supplemented in particular by the detection of the point detection unit.

In an alternative advantageous refinement, the beam splitter unit is formed by a micromirror actuator unit (digital mirror device, DMD) controllable by the control unit. The micromirror actuator unit is designed in such a way that at least a first part of detection light associated with the predetermined subregion of the sample, which originates from the selected region, is deflected onto the point detection unit and a second part of the detection light originating from the selected region, which is complementary to the first part, is deflected onto the camera detection unit. In this way, the micromirror actuator unit permits all of the detection light originating from the predetermined subregion of the sample to be deflected onto the point detection unit even if the predetermined subregion has a complex geometrical form. In this way, the entire predetermined subregion can be acquired in one measurement. Furthermore, the mirrors of the micromirror actuator unit each have a lower mass than, for example, a single galvanometer mirror, whereby the beam splitter unit formed by the micromirror actuator unit may be switched faster. The switching of the micromirror actuator unit can take place within a few microseconds or less, so that a rapid point-resolved measurement by means of the point detection unit at one point or in multiple regions of the sample is also possible during a single exposure time of the camera detection unit.

The micromirror actuator unit consists of a plurality of switchable micromirrors a few micrometers in size, which can be actuated individually. Each micromirror is designed in such a way that in a first switching state, it deflects detection light that originates from the sample onto the camera detection unit, and that in a second switching state, it deflects the detection light originating from the sample onto the point detection unit.

In a further alternative advantageous refinement, the beam splitter unit is formed by a neutral beam splitter, a polarization beam splitter (polarizing beam splitter), or a dichroic mirror. In this case, the beam splitter unit does not have any mechanically moving components and thus has a low susceptibility to malfunction. Furthermore, the use of such a beam splitter unit is linked to low manufacturing costs. The detection light can be split according to color (dichroic mirror) and/or polarization directions (polarization beam splitter) using such a beam splitter unit.

In a further advantageous refinement, the microscope comprises a first tube lens. The first tube lens is arranged between the detection objective and the beam splitter unit and is used jointly by the camera detection unit and the point detection unit. This refinement is particularly space-saving since the necessity of separate tube lenses arranged on the image side of the beam splitter unit in the first detection beam path and the second detection beam path is dispensed with here.

In an alternative advantageous refinement, the microscope comprises a first tube lens and a second tube lens. The first tube lens is arranged between the beam splitter unit and the camera detection unit. The second tube lens is arranged between the beam splitter unit and the point detection unit.

In one advantageous refinement, the point detection unit comprises a tilting mirror controllable by the control unit, which is arranged on the image side of the beam splitter unit in the second detection beam path. The control unit controls the tilting mirror in particular in such a way that at least a part of the detection light originating from the predetermined subregion is acquired. The predetermined subregion can be scanned in multiple successive measurements and completely acquired serially in this way.

In a further advantageous refinement, the point detection unit comprises a micromirror actuator unit (DMD), which is different from the beam splitter unit, is controllable by the control unit, and is arranged on the image side of the beam splitter unit in the second detection beam path. Each micromirror of this micromirror actuator unit is designed in such a way that in a first switching state, it deflects detection light originating from the sample along the second detection beam path onto a detection unit, and that in a second switching state, it deflects the detection light originating from the sample, for example, onto an absorber or a further detection unit. The micromirror actuator unit is preferably arranged for this purpose in a plane conjugated with the image plane of the camera detection unit.

In a further advantageous refinement, the point detection unit is designed in such a way that detection light originating from the predetermined subregion of the sample is acquired in a spectrally resolved manner. For example, the point detection unit can comprise a fiber-coupled spectrometer. In addition to the generation of high-resolution spectral data, this also permits in particular the identification of fluorophores superimposed in the predetermined subregion, which is not possible with the aid of the camera detection unit alone.

The point detection unit preferably comprises a dispersive element, which spectrally splits a light beam incident in the point detection unit. The point detection unit comprises a spectral detector, which is formed as an arrangement, consisting of multiple detector units, for detecting the spectrally split light beam. The spectrally resolved acquisition of the predetermined subregion of the sample is enabled in this way.

In a further advantageous refinement, the wide-field illumination unit is designed to generate a light sheet. Thin layers of the sample can be illuminated with the aid of the light sheet and excited to fluorescence. A higher resolution than with other methods for wide-field illumination is achieved in this way.

In a further advantageous refinement, the detection objective is designed as an illumination objective of the wide-field illumination unit. The microscope can be made particularly space-saving in this way. Such arrangements are used in particular in oblique plane microscopy (OPM) and swept confocally-aligned planar excitation (SCAPE) microscopy.

Further features and advantages of embodiments of the invention result from the following description, which explains the invention in greater detail on the basis of exemplary embodiments in conjunction with the appended figures.

FIG. 1 shows an exemplary embodiment of a microscope 10a. The microscope 10a comprises a wide-field illumination unit 12, a beam splitter unit 16, a camera detection unit 22, a point detection unit 24, and a control unit 28.

The wide-field illumination unit 12 comprises a light source 40, an illumination objective 42, and a deflection mirror 44. The light source 40 generates illumination light, from which a light sheet lying in the object plane is generated with the aid of the illumination objective 42 and the deflection mirror 44. The light sheet illuminates at least one selected region of a sample 14. The illumination light is preferably light which excites fluorophores located in the sample 14 to fluorescence/phosphorescence.

The beam splitter unit 16 is arranged on the image side of the sample 14 and is designed as a beam splitter cube by way of example in FIG. 1. Alternatively, the beam splitter unit 16 can be a beam splitter plate, a neutral density filter, a polarization filter, a chromatic or dichromatic filter, a mirror which can be mechanically introduced into the beam path and displaced, an electronically switchable mirror, or a component which combines various features of the above-mentioned components. A detection objective 26 is arranged between the sample 14 and the beam splitter unit 16. The beam splitter unit 16 splits detection light originating from the sample 14 after passage through the detection objective 26 by transmission onto a first detection beam path 18 and by reflection onto a second detection beam path 20. Both the first detection beam path 18 and also the second detection beam path 20 begin on the object plane, i.e., in the sample 14. The detection objective 26 is therefore as it were both in the first detection beam path 18 and also in the second detection beam path 20.

The camera detection unit 22 is designed in particular as a multichannel camera or color camera and is arranged within the first detection beam path 18. A first tube lens 32 is arranged between the beam splitter unit 16 and the camera detection unit 22. In this way, an arrangement for recording images of the selected region of the sample 14 is implemented in the first detection beam path 18.

The point detection unit 24 is arranged within the second detection beam path 20. The point detection unit 24 comprises a controllable tilting mirror 36, a detector 46, and further optical elements, which are identified in general here with the reference sign 48, for example (pinhole) apertures, filters, or lenses. In particular, a (pinhole) aperture can be arranged in front of the detector 46. Detection light associated with individual points or punctiform regions on the sample 14 can be deflected by the tilting mirror 36 onto the detector 46. By tilting the tilting mirror along two axes perpendicular to one another, a predetermined subregion (for example, a selected region of interest or region in which multiple different fluorophores are superimposed), which is in particular within the selected region, can be completely acquired in successive measurements. The detector 46 is designed to detect the detection light incident via the second detection beam path with high spectral and/or time resolution. For example, the detector 46 is formed by a fiber-coupled spectrometer or an avalanche photodiode (APD). The detector 46 can also be formed by a dispersive element, which spectrally splits a light beam incident in the point detection unit 24, and an arrangement consisting of multiple detector units for detecting the spectrally split light beam.

A second tube lens 34 is arranged between the beam splitter unit 16 and the point detection unit 24 in the second detection beam path 20. An arrangement for the serial acquisition of the predetermined region similarly as with a confocal microscope is formed in this way in the second detection beam path 20.

Figure 4:
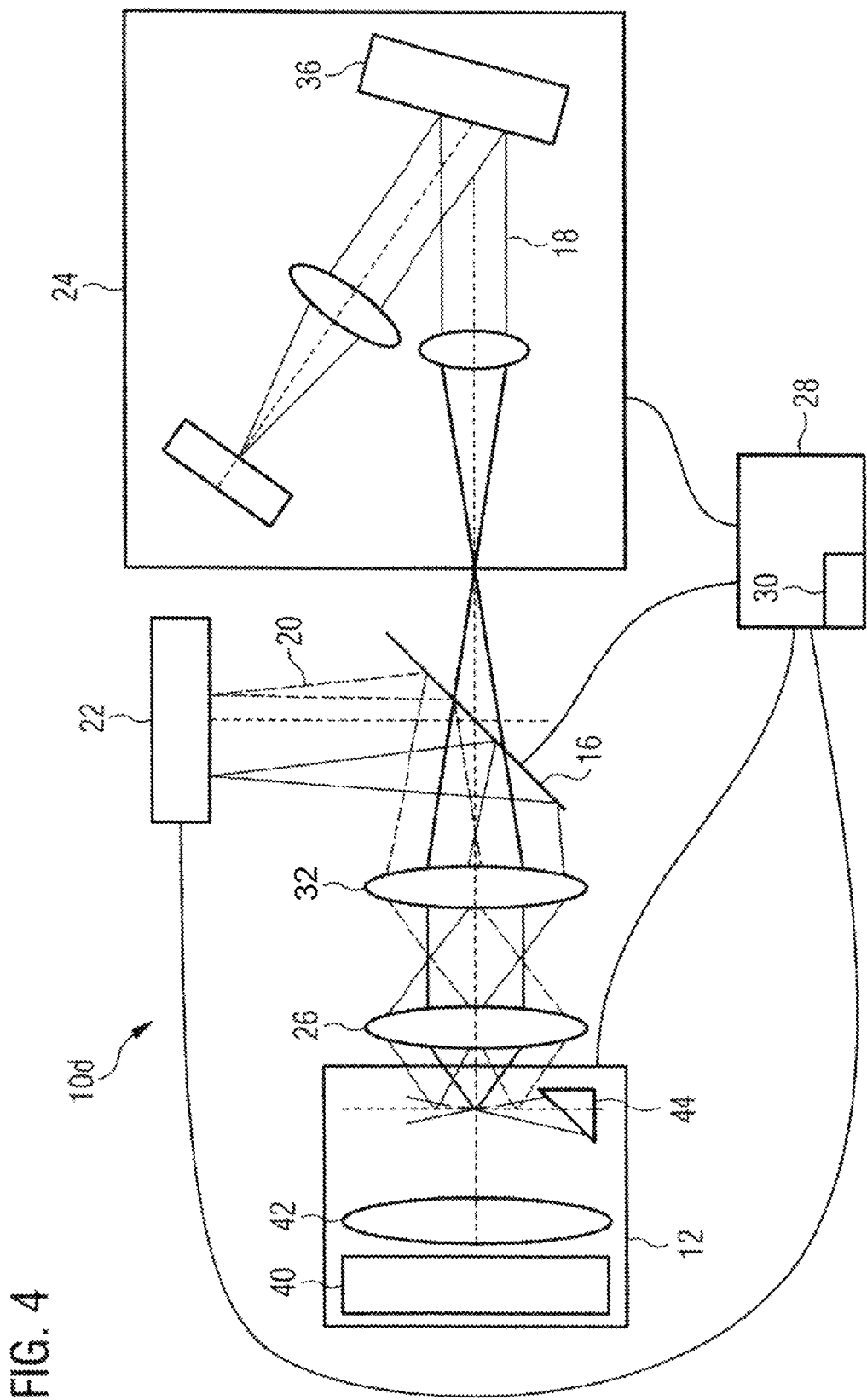
FIG. 4 shows a further exemplary embodiment of a microscope having a camera detection unit and a point detection unit.

The detection objective 26 and the second tube lens 34 form a system made up of two lenses at the distance of their focal lengths, which is also called a $4f$ system, in the exemplary embodiment shown. Such a $4f$ system is telecentric and thus has positive imaging properties, for example the magnification is not dependent on the distance between the object plane and the image plane. This means that an infinite beam path is present between the detection objective 26 and the second tube lens 34, thus a part of the beam path in which the light is collimated. The beam splitter unit 16 defines an interface between two media, for example glass and air, which is tilted in relation to the normal to the optical axis, and is therefore arranged within this infinite beam path. The occurrence of aberrations is avoided by the arrangement in the infinite beam path. This is clear in particular with reference to the exemplary embodiment described below on the basis of FIG. 4, in which the beam splitter unit 16 is arranged in a non-collimated beam path and therefore the light transmitted by the beam splitter unit 16 (and thus aberrated) is deflected onto the point detection unit 24, which is insensitive to aberrations. In general, beam splitters in an infinite beam path (collimated light beam) can be designed as plates, whereas they are advantageously implemented as cubes in non-infinite beam paths (focused or defocused light beam), in order to avoid aberrations. An exception to this is shown in FIG. 4. Beam splitter plates typically have advantages over beam splitter cubes with respect to their spectral splitting properties and are often also less expensive.

In an alternative embodiment, the detection objective 26 and the second tube lens 34 do not form a telecentric $4f$ optical unit. To nonetheless not generate aberrations, for example, the detection objective 26 is corrected in such a way that in cooperation with a correspondingly positioned tube lens, light which originates from a sample-side plane of the detection objective 26 is imaged sharply on a detector, but this light does not run in collimated form between the detection objective 26 and the second tube lens 34. In this case, the imaged sample-side plane is not congruent with the focal plane by definition of the detection objective 26. Further alternative embodiments are conceivable. It is decisive that a focus is not formed between the detection objective 26 and the second tube lens 34.

Furthermore, the lenses 48 form a telecentric $4f$ optical unit. This ensures that aberrations are not induced by the tilting mirror 36.

The control unit 28 is designed in such a way that the predetermined subregion of the sample 14 and/or a predetermined time (for example the time of a biological event of interest in the sample 14) is storable in the control unit 28 for measurement using the point detection unit 24. For example, the predetermined subregion and/or the predetermined time can be input into the control unit 28 by an operator. The control unit 28 furthermore comprises an image processing unit 30, which is designed to ascertain the predetermined subregion of the sample 14 and/or the predetermined time for the measurement using the point detection unit 24 and provide it to the control unit 28. The control unit 28 is furthermore connected to the camera detection unit 22 and the beam splitter unit 16 and is designed to control them. In particular, the beam splitter unit 16 can be controlled to change filters flexibly and automatically, for example for specific image regions.

The predetermined subregion of the sample 14 and/or the predetermined time for the measurement using the point detection unit 24 is in particular ascertained by the operator and/or the image processing unit 30 on the basis of the images of the selected region of the sample 14 recorded by the camera detection unit 22. For example, the image processing unit 30 can identify pixels in the images recorded by the camera detection unit 22 in which various fluorophores are superimposed and can determine these as the predetermined subregion. A spectrally resolved measurement can then be carried out by means of the point detection unit 24, which permits a unique identification of the fluorophores of the predetermined subregion. For example, physiological or neurological events taking place in the sample 14, which are identified by the image processing unit 30, can be used as the basis of the determination of the predetermined time.

The control unit 28 controls the tilting mirror 36 of the point detection unit 24 and the wide-field illumination unit 12 in dependence on the predetermined subregion of the sample 14 and/or the predetermined time for the measurement using the point detection unit 24. The tilting mirror 36 of the point detection unit 24 is controlled by the control unit 28 in such a way that the entire predetermined subregion of the sample 14 is acquired in successive measurements using the point detection unit 24. The point detection unit 24 is controlled by the control unit 28, for example, in such a way that by changing the diameter of a pinhole aperture, the size of a region scanned in a measurement, which is in particular punctiform or circular, is integrated over the one detector of the point detection unit 24. The control unit 28 can furthermore, for example, control the wavelength of the illumination light generated by the wide-field illumination unit 12.

The combination of a point detector with a light sheet illumination opens up new freedoms. In a typical point-scanning confocal microscope, the region over which integration is performed during a single measurement cannot be readily varied. The numerical aperture of an illumination beam defines the distribution of the illumination light. The illuminated region thus cannot be enlarged easily, for example. This would require stopping down or reducing the numeric aperture of the illumination and accompanying this an undesired lengthening of the depth of field of the illumination focus. Alternatively, this could also be achieved by an enlargement of the diameter of a pinhole aperture of a point detector used in typical point-scanning confocal microscopes. However, the depth of field of the detection (depth discrimination) is significantly worsened in this way. The illumination using a light sheet is therefore an important building block to increase the freedom in the scanning using the point detection unit. A measurement integrated over a larger region of the sample by means of a detector can increase, for example, the sensitivity and/or the time resolution of the measurement.

Figure 2:
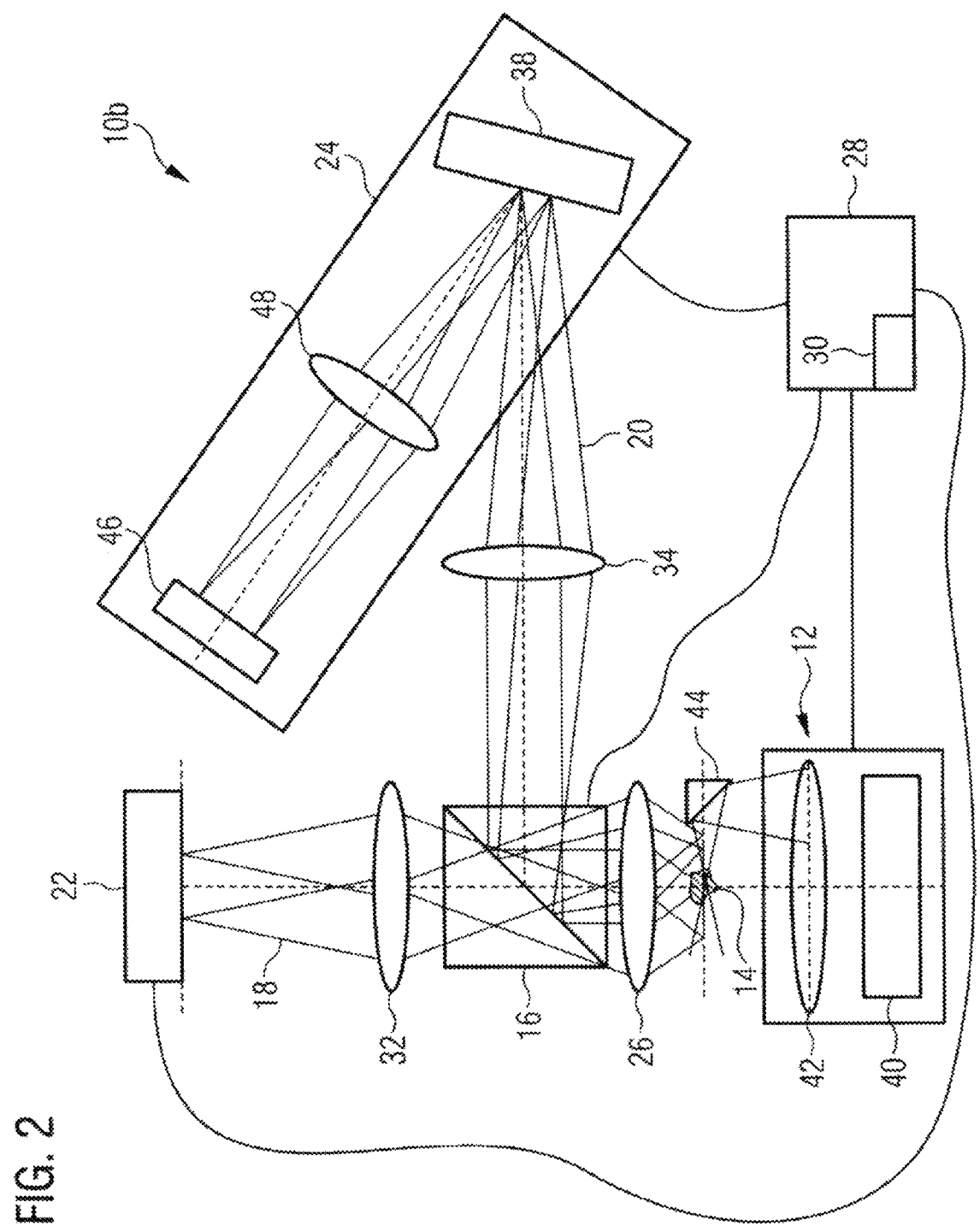
FIG. 2 shows a further exemplary embodiment of a microscope having a camera detection unit and a point detection unit.

FIG. 2 shows a further exemplary embodiment of a microscope 10b. The exemplary embodiment shown in FIG. 2 differs from the exemplary embodiment shown in FIG. 1 in that the point detection unit 24 has a micromirror actuator unit 38 (digital mirror device, DMD) instead of a controllable tilting mirror 36.

The micromirror actuator unit 38 is arranged on the image side of the beam splitter unit 16 in the second detection beam path 20 in a plane conjugated with the image plane of the camera detection unit 22. The micromirror actuator unit 38 consists of a plurality of switchable micromirrors a few micrometers in size, which can be actuated individually, for example by the control unit 28. Each micromirror of the micromirror actuator unit 38 is designed in such a way that in a first switching state, the detection light originating from the sample 14 is deflected onto the detector 46, and that in a second switching state, the detection light originating from the sample 14 is deflected onto an absorber. Since the micromirror actuator unit 38 is arranged in the plane conjugated with the image plane of the camera detection unit 22, detection light respectively associated with the individual pixels of the images recorded by the camera detection unit 22 can be deflected in a targeted manner onto the detector 46 by switching individual micromirrors of the micromirror actuator unit 38. The micromirror actuator unit 38 more or less acts as an aperture of the point detection unit 24, since it can limit the detection light incident in the detector 46.

The detection light beams 20 are incident in collimated form on the detector 46. Therefore, two points are not imaged on the detector 46, but rather two collimated beam paths tilted in relation to one another are incident on the detector 46. The detector 46 thus integrates the signal over the points selected by the micromirror actuator unit 38. The micromirror actuator unit 38 is in a plane conjugated with the focal plane of the detection objective 26 in the exemplary embodiment shown in FIG. 2.

Figure 3:
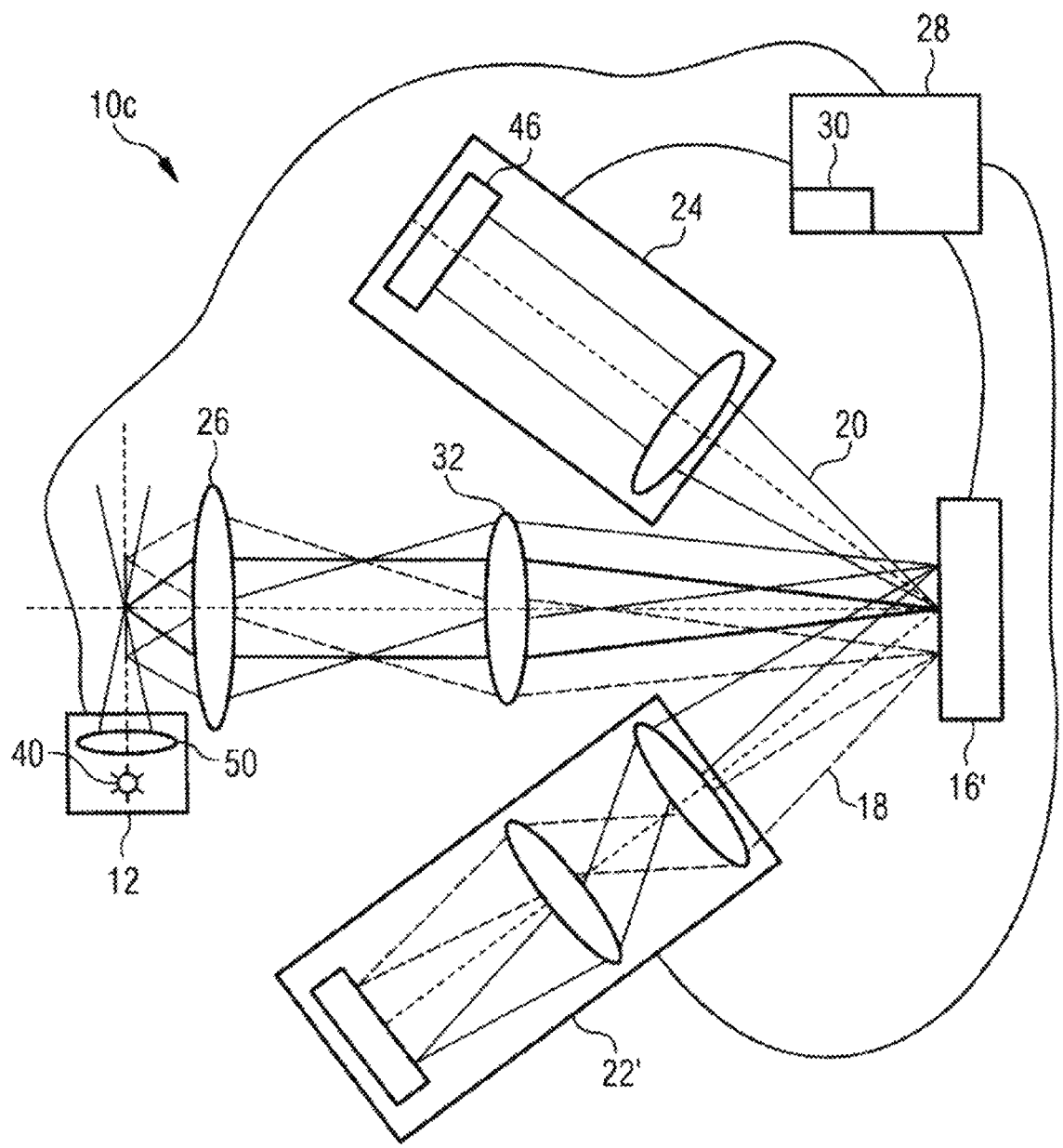
FIG. 3 shows a further exemplary embodiment of a microscope having a camera detection unit and a point detection unit.

FIG. 3 shows a further exemplary embodiment of a microscope 10c. The exemplary embodiment shown in FIG. 3 differs from the exemplary embodiment shown in FIG. 1 on the one hand in that the beam splitter unit 16' is formed by a micromirror actuator unit controlled by the control unit 28. On the other hand, the wide-field illumination unit 12 in the exemplary embodiment shown in FIG. 3 comprises, in addition to the light source 40, a cylinder optical unit 50 for generating a light sheet.

Each micromirror of the micromirror actuator unit forming the beam splitter 16' is designed in such a way that in a first switching state, detection light which originates from the sample 14 is deflected onto the camera detection unit 22', and that in a second switching state, the detection light originating from the sample 14 is deflected onto the point detection unit 24. The detection light respectively associated with individual pixels of the images recorded by the camera detection unit 22' can be deflected in a targeted manner into the point detection unit 24 by switching individual micromirrors of the micromirror actuator unit. The predetermined subregion may therefore be completely acquired in one or more measurements independently of its specific geometrical design.

In the exemplary embodiment shown in FIG. 3, the requirement for the second tube lens 34 is dispensed with, since the point detection unit does not require a high imaging quality.

FIG. 4 shows a further exemplary embodiment of a microscope 10d. In this exemplary embodiment, the beam splitter unit 16 generates, from the detection light originating from the sample 14, the first detection beam path 18 by reflection and the second detection beam path 20 by transmission. The aberrations induced by the transmission are noncritical for a measurement using the point detection unit 24 arranged in the second detection beam path 20. Due to this arrangement, the requirement of a separate tube lens arranged on the image side of the beam splitter unit 16 is dispensed with (i.e., the tube lenses 32, 34 for each detection beam path 18, 20 of the microscope 10 according to FIGS.

1 and 2 are dispensed with here). The single tube lens 32 is arranged between the beam splitter unit 16 and the detection objective 26.

Figure 5:
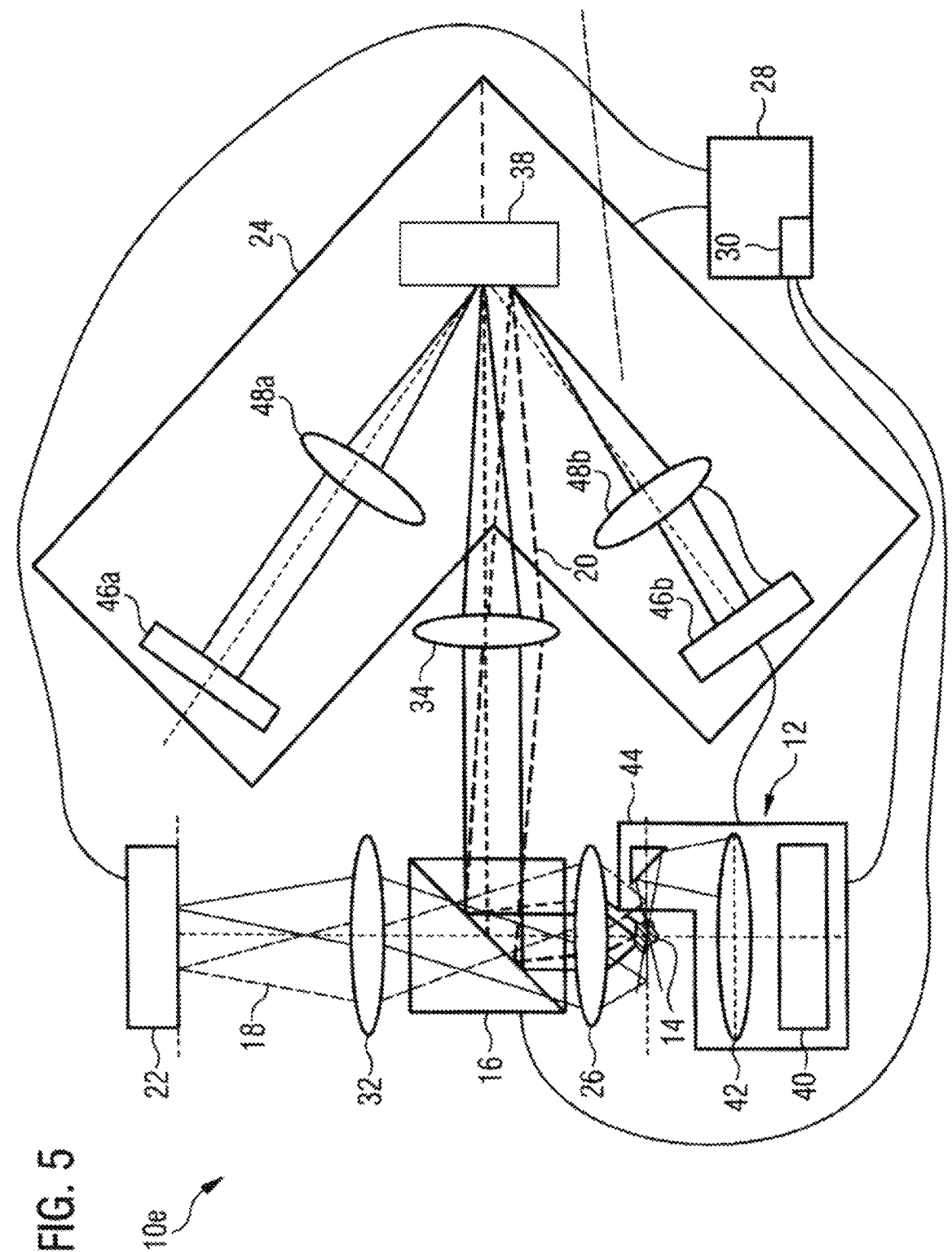
FIG. 5 shows a further exemplary embodiment of a microscope having a camera detection unit and a point detection unit.

FIG. 5 shows a further exemplary embodiment of a microscope 10e. The microscope 10e shown in FIG. 5 essentially differs from the microscope 10a shown in FIG. 1 in that the point detection unit 24 comprises a first detector 46a and a second detector 46b. Identical or identically acting elements are identified by the same reference signs in FIGS. 1 and 5. The micromirror actuator unit 38 of the point detection unit 24 is designed in such a way that by switching individual micromirrors of the micromirror actuator unit 16, the detection light which is respectively associated with individual pixels of the images recorded by the camera detection unit 22 can be deflected alternately onto the first detector 46a or the second detector 46b. The point detection unit 24 thus enables the simultaneous acquisition of multiple points.

Exemplary embodiments of the invention enable the strengths of a camera detection to be combined with those of the point detection in a single microscope 10.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 10a to 10d microscope
12 wide-field illumination unit
14 sample
16, 16' beam splitter unit
18, 20 detection beam path
22, 22' camera detection unit
24 point detection unit
26 detection objective
28 control unit
30 image processing unit
32, 34 tube lens
36 tilting mirror
38 micromirror actuator unit
40 light source
42 illumination objective
44 deflection mirror
46 detector
48 optical elements

The invention claimed is:

1. A microscope, comprising:
a wide-field illuminator configured to illuminate at least one selected region of a sample;
a beam splitter configured to generate a first detection beam path and a second detection beam path;
a camera detector arranged within the first detection beam path and configured to record images of the selected region of the sample;
a point detector arranged within the second detection beam path and configured to acquire a predetermined subregion of the sample lying within the selected region;
a detection objective, which is arranged within the first and second detection beam paths on an object side of the beam splitter, the detection objective being a common detection objective for the camera detector and the point detector; and
a controller configured to control at least the point detector in dependence on the predetermined subregion of the sample and/or in dependence on a predetermined time for a measurement that can be carried out using the point detector.

2. The microscope as claimed in claim 1, wherein the predetermined subregion of the sample and/or the predetermined time is stored preset in the controller.

3. The microscope as claimed in claim 1, further comprising an image processor coupled to the controller, which is configured to ascertain the predetermined subregion of the sample and/or the predetermined time based on at least one of the images recorded by the camera detector, and which is configured to provide the predetermined subregion of the sample and/or the predetermined time for the controller to control the point detector.

4. The microscope as claimed in claim 1, wherein the controller is configured to control the wide-field illuminator in dependence on the predetermined subregion of the sample and/or in dependence on the predetermined time.

5. The microscope as claimed in claim 1, wherein the beam splitter is formed by a mirror element switchable by the controller, which is designed in such a way that in a first switching state, detection light which originates from the sample is deflected onto the camera detector, and that in a second switching state, the detection light originating from the sample is deflected onto the point detector.

6. The microscope as claimed in claim 1, wherein the beam splitter is formed by a micromirror actuator controllable by the controller, which is designed in such a way that at least a first part of detection light, which is associated with the predetermined subregion of the sample and originates from the selected region, is deflected onto the point detector, and that a second part of the detection light originating from the selected region, which is complementary to the first part, is deflected onto the camera detector.

7. The microscope as claimed in claim 1, wherein the beam splitter is formed by a neutral beam splitter or a dichroic mirror.

8. The microscope as claimed in claim 1, further comprising a first tube lens arranged between the detection objective and the beam splitter, the first tube lens being arranged to be used jointly by the camera detector and the point detector.

9. The microscope as claimed in claim 1, further comprising a first tube lens and a second tube lens, the first tube lens being arranged between the beam splitter and the camera detector, and the second tube lens being arranged between the beam splitter and the point detector.

10. The microscope as claimed in claim 1, wherein the point detector comprises a tilting mirror controllable by the controller, the tilting mirror being arranged on an image side of the beam splitter in the second detection beam path.

11. The microscope as claimed in claim 1, wherein the point detector comprises a micromirror actuator, which is different from the beam splitter, is controllable by the controller, and is arranged on an image side of the beam splitter in the second detection beam path.

12. The microscope as claimed in claim 1, wherein the point detector is configured such that detection light originating from the predetermined subregion of the sample is acquired in a spectrally resolved manner.

13. The microscope as claimed in claim 1, wherein the point detector comprises:
 a dispersive element configured to spectrally split a light beam incident in the point detector; and
 a spectral detector, which is formed as an arrangement of multiple detectors, configured to detect the spectrally split light beam.

14. The microscope as claimed in claim 1, wherein the wide-field illuminator is configured to generate a light sheet.

15. The microscope as claimed in claim 1, wherein the detection objective is an illumination objective of the wide-field illuminator.

16. A microscope, comprising:
 a wide-field illuminator configured to illuminate at least one selected region of a sample;
 a beam splitter configured to generate a first detection beam path and a second detection beam path;
 a camera detector arranged within the first detection beam path and configured to record images of the selected region of the sample;
 a point detector arranged within the second detection beam path and configured to acquire a predetermined subregion of the sample lying within the selected region; and
 a detection objective, which is arranged within the first and second detection beam paths on an object side of the beam splitter, the detection objective being a common detection objective for the camera detector and the point detector,
 wherein the point detector is configured such that detection light originating from the predetermined subregion of the sample is acquired in a spectrally resolved manner.

17. A microscope, comprising:
 a wide-field illuminator configured to illuminate at least one selected region of a sample;
 a beam splitter configured to generate a first detection beam path and a second detection beam path;
 a camera detector arranged within the first detection beam path and configured to record images of the selected region of the sample;
 a point detector arranged within the second detection beam path and configured to acquire a predetermined subregion of the sample lying within the selected region; and
 a detection objective, which is arranged within the first and second detection beam paths on an object side of the beam splitter, the detection objective being a common detection objective for the camera detector and the point detector,
 wherein the point detector comprises:
  a dispersive element configured to spectrally split a light beam incident in the point detector; and
  a spectral detector, which is formed as an arrangement of multiple detectors, configured to detect the spectrally split light beam.

18. A microscope, comprising:
 a wide-field illuminator configured to illuminate at least one selected region of a sample;
 a beam splitter configured to generate a first detection beam path and a second detection beam path;
 a camera detector arranged within the first detection beam path and configured to record images of the selected region of the sample;
 a point detector arranged within the second detection beam path and configured to acquire a predetermined subregion of the sample lying within the selected region; and
 a detection objective, which is arranged within the first and second detection beam paths on an object side of the beam splitter, the detection objective being a common detection objective for the camera detector and the point detector,
 wherein the wide-field illuminator is configured to generate a light sheet.

* * * * *